United States Patent [19]

Kono et al.

[11] Patent Number: 4,859,033
[45] Date of Patent: Aug. 22, 1989

[54] METHOD OF PRODUCING OPTICAL HEAD ASSEMBLY

[75] Inventors: Keizo Kono; Mitsushige Kondou, both of Kyoto; Natsuro Tsubouchi; Shiro Hine, both of Hyogo; Hiroshi Nishihara; Toshiaki Suhara, both of Osaka, all of Japan

[73] Assignee: Mitsubishi Denki Kabushiki Kaisha, Tokyo, Japan

[21] Appl. No.: 188,210

[22] Filed: Apr. 29, 1988

Related U.S. Application Data

[62] Division of Ser. No. 855,110, Apr. 23, 1986, Pat. No. 4,779,259.

[30] Foreign Application Priority Data

Apr. 25, 1985 [JP] Japan .................................. 60-89590
Jun. 24, 1985 [JP] Japan ................................ 60-137531

[51] Int. Cl.$^4$ ......................... G02B 27/00; G11B 5/09
[52] U.S. Cl. ....................................... 350/320; 369/46
[58] Field of Search ............... 350/320, 96.18; 369/44, 369/46, 62, 106, 112, 122, 145; 437/36, 127

[56] References Cited

U.S. PATENT DOCUMENTS 4,718,052 1/1988 Kondo et al. .......................... 369/44
4,760,568 7/1988 Hine ................................... 369/122

Primary Examiner—Bruce Y. Arnold
Assistant Examiner—Loha Ben
Attorney, Agent, or Firm—Wolf, Greenfield & Sacks

[57] ABSTRACT

An optical IC-type head assembly for recording and for reading information on an optical disc, comprising a substrate, a light guiding layer comprising a dielectric thin film formed monolithically on the substrate, a laser oscillator for injecting the laser beam into the light guiding layer, a grating coupler for converging the laser beam on the optical disc, and a photo detector for receiving the beam reflected by the optical disc and coming out of the grating coupler. In one embodiment the substrate is made of material having cleavability. One side surface of the light guiding layer receiving the laser beam is a break surface formed by cleaving the substrate along the cleavage plane. The photo detector is disposed at the break surface of the light guiding layer. The substrate is preferably made of single crystal material. In another embodiment, a beam splitter is disposed between the laser oscillator and the grating coupler for splitting the reflected beam coming out of the grating coupler into two symmetrical beams. Each split beam forms an acute angle with respect to the optical axis of the reflected beam. The acute angle is preferably less than 30 degrees. The beam splitter may converge each of the split beams at a photo detecting element disposed between the laser oscillator and the grating coupler.

5 Claims, 5 Drawing Sheets

METHOD OF PRODUCING OPTICAL HEAD ASSEMBLY

This application is a division of application Ser. No. 855,110, filed Apr. 23, 1986, now U.S. Pat. No. 4,779,259.

FIELD OF THE INVENTION

The present invention relates to an optical head assembly for recording information on an optical disc and/or reading information therefrom, and more specifically to provide a novel and improved optical IC-type head assembly therefor.

DESCRIPTION OF THE PRIOR ART

FIG. 1 is a block diagram of a well-known optical head assembly which is provided with a laser diode 104, a collimating lens 105, a beam splitter 106, an objective lens 107 and a photo detector 109. The laser beam from the laser diode 104 is collimated through the collimating lens 105. The collimated beam passes through the beam splitter 106 and is focused by the objective lens 107 to form a spot on a disc 113. Part of the incident beam reflected by the disc 113 again passes through the objective lens 107. Then, its advancing direction is changed by 90° by the beam splitter 106, and thereafter the reflected beam is converted into an electric signal by the photo detector 109. A differential amplifier 117 detects a difference in the output signals between two sections in the photo detector.

The disc 113 is provided with a track (or guide groove) 114 which comprises a plurality of pits. In order to record or reproduce information accurately, a beam spot must be positioned at the center of the track 114.

Thus, the well-known optical head assembly comprises the combination of discrete optical parts such as lens and beam splitter, so it is necessary to use a fine adjustment mechanism in order to align the optical axes of those parts accurately in assembly. Accordingly, this assembly becomes large in size and the cost for assembling and adjusting it is increased.

To reduce the apparatus size and simplify its construction, there have been proposed various types of the optical IC-type head assemblies in which optical elements are integrated on a single substrate.

FIGS. 2–7 illustrate some examples of such head assemblies constituting the prior art of the present invention.

FIG. 2 shows the first example of the prior art, in which an optical IC-type head assembly designated by the reference numeral 10 comprises a substrate 1, a buffer layer 2 formed on the substrate 1 by such means as oxidation or vapor deposition, and a light guiding layer 3 comprising a dielectric thin film formed on the buffer layer 2 by vapor deposition or other suitable means. The refraction index of the layer 3 is larger than that of the substrate 1. Further a collimating lens 5, a beam splitter 6 and a convergingtype grating coupler 7 formed by unequally spaced curves are formed on the dielectric thin film-like light guiding layer 3 by a photolithographic method, an electron beam drawing method or an etching method applied to an ultraviolet curing resin. The numeral 4 denotes a semiconductor laser diode for injecting the laser beam to the light guiding layer 3, and the numeral 9 denotes a photo detector having two light-receiving surfaces and attached to one end of the optical head assembly so as to be aligned in its center line with the optical axis of the incident beam. The numeral 8 denotes a beam focussing at a point.

The optical head assembly 10 of this first example operates as follows. The laser beam emitted from the laser diode 4 which is attached to one end of the optical IC-type head assembly 10, while passing through the light guiding layer 3, becomes a collimated beam through the collimating lens 5, and then passes through the beam splitter 6. The grating coupler 7 emits the laser beam received from the light guiding layer 3 into a free space to form a spot. The converged laser beam is reflected by the disc surface. The reflected beam again enters the converging-type grating coupler 7 and propagates through the light guiding layer 3 toward the beam splitter 6. Then the beam is bent toward the photo detector 9 by the beam splitter 6 and received by the photo detector 9 which converts the beam into electrical signals. The dielectric thin film-like light guiding layer 3 has a smooth side surface at which the semiconductor laser diode 4 is mounted in order to inject the laser beam into the smooth side surface.

Referring now to FIG. 3, there is illustrated a modification of the first example, in which the photo detector 9 is formed in the substrate 1 in accordance with a semiconductor process. The substrate 1 is formed of a semiconductor material, e.g. P-type single crystal silicon. The buffer layer 2 is formed by vapor deposition or heating in an oxidative atmosphere and the like. A portion of the buffer layer 2 corresponding to the photo detector 9 is removed by photolithography and etching. Then n-type impurity is diffused to form n+ diffused layer, and, after mounting electrodes 11, optical IC components such as the dielectric thin film-like light guiding layer 3 and the beam splitter 6 are formed. In the optical head assembly thus fabricated, the collimating lens 5, the beam splitter 6, the converging grating coupler 7 and the photo detector 9 are formed by such methods as photolithography, electron beam drawing or etching. Therefore, these components are positioned accurately with each other and it becomes unnecessary to make a positional adjustment after assembly.

Referring now to FIGS. 4 and 5, there are illustrated the second example of the prior art and a positional relation between the head assembly and an optical disc. Hereafter parts corresponding to those shown in FIG. 2 are indicated by the same reference numerals. In this example, a diffraction grating 12 is disposed between the collimating lens 5 and the beam splitter 6, and a sensor lens 13 is disposed between the beam splitter 6 and the photo detector 9. The photo detector 9 has three light-receiving elements corresponding to three focused spots indicated by the reference numerals 8a, 8b and 8c. The outputs from two elements corresponding to the focused spots 8b and 8c are fed to a signal processing circuit 15 including a differential amplifier 14.

Integration of the optical components on a dielectric thin film-like light guiding layer 3 can be effected by a known method.

In operation, the light beam emitted from the laser diode 4 is collimated through the collimating lens 5 and is then divided into plural beams by the diffraction grating 12. The divided beams then pass through the beam splitter 6 and are focused at every order of beam by the converging-type grating coupler 7 to form focused spots 8a 8b and 8c of one zero order beam and two first order beams on the track of the recording medium.

The light beams reflected by the track pass through the converging-type grating coupler 7 and are bent toward the sensor lens 13 by the beam splitter 6. The zero order and first order beams which have passed through the lens 13 impinge on the photo detector 9 and thereby converted to electrical signals.

Referring now to FIGS. 6, there is illustrated the third example of the prior art, in which the numeral 16 denotes a silicon (Si) substrate; the numeral 17 denotes an $SiO_2$ film having 1–2 $\mu$m thickness formed on the silicon substrate 16; and the numeral 18 denotes a thin film-like light guiding layer having $\mu$m thickness formed on the $SiO_2$ film 17. The light g. layer 18 may be formed of material such as #7059 glass (a product of Corning Glass Works). A semiconductor laser 19 is coupled to the light guiding layer 18 so that the beam emitted therefrom impinges on the layer 18, through which the beam propagates. The numeral 20 denotes a diffused beam injected from the semiconductor laser 19 into the light guiding layer 18; the numeral 21 denotes a grating-like collimating element for collimating the diffused beam 20 into a collimated beam 22, the collimating element 21 comprising a 1–2 $\mu$m thick SiN film. Further, the numeral 23 denotes a grating-like beam splitting element for separating a reflected beam 25 after reading information on the disc from a beam 24 radiated to the disc. The beam splitting element 23 comprises a 1–2 $\mu$m thick SiN film. The numeral 26 denotes a grating-type converging element for converging the radiated beam 24 to a beam spot 27, the converging element 26 comprising a 1–2 $\mu$m thick film. The numeral 28 denotes a grating-type b dividing/converging element for dividing the reflected beam 25 into two beams and converging the two beams to separate spots, the beam dividing/converging element 28 comprising a 1–2 $\mu$m thick SiN film.

In this optical head assembly having the above construction, the light is emitted from the semiconductor laser 19 as the diffused beam 20, and then becomes the collimated beam 22 through the collimating element 21. The collimated beam 22 passes through the beam splitting element 23 and becomes the irradiation beam 24, which in turn is converged to the beam spot 27 by the converging element 26.

The reflected beam after reading the information out of the disc surface again becomes a collimated beam through the converging element 26 and propagates through the light guiding layer 18. Then the reflected beam 25 is separated from the beam 22 by the beam splitting element 23. The reflected beam 25 is divided into two beams 29a and 29b and converged on the photo detectors 30a and 30b by the beam dividing/converging elements 28. The photo detectors 30a and 30b are located at the focused positions of the beams 29a and 29b when the information surface coincides with the focal point of the converging element 26, and supply the output electric signals to a signal processing circuit 31.

The collimating element 21, the beam splitting element 23, the converging element 26 and the beam dividing/converging element 28 can be formed, for example, by forming a thin SiN film on glass by CVD (Chemical Vapour Deposition), applying a photo resist coating, exposing it to electron beam so that the photo resist remains on the portions of the above stated optical elements, and then subjecting the SiN film portion other than the optical element portion to plasma etching.

Although in the third example the photo detectors 30a and 30b are disposed at an end face of the thin film-like light guiding layer 18, photo detectors may be formed monolithically by diffusing impurity on an n-type silicon substrate to thereby form P layer. FIG. 7 shows such photo detectors 32a and 32b embedded in the substrate 33.

In the above described optical head assemblies, the laser beam emitted by the semiconductor laser diode impinges on the light receiving surface of the light guiding layer and is guided through various optical elements. In order to inject the laser beam from the laser diode to the light guiding layer as much as possible, it is imperative not only to dispose the emission surface of the laser diode at the light receiving surface of the light guiding layer, but also to make the light receiving surface perfect and smooth and positioned perpendicular to the light axis. It is, therefore, necessary to polish the side surface of the light guiding layer manually at an optical precision. Further, there are difficulties for automation and massproduction due to the necessity of manual work and complexed manufacturing processes.

Moreover, these optical head assemblies are constructed such that the beam splitter bends the reflected beam by the angle of 90 degrees, so there are problems of the widened spot on the disc due to the diffusion of the incident beam to the converging-type grating coupler and the increase of aberration.

SUMMARY OF THE INVENTION

The present invention provides a novel and improved optical IC-type head assembly and a method for producing such a head assembly.

In one aspect of the present invention, an optical IC-type head assembly includes a light receiving surface for receiving a laser beam from a laser oscillator efficiently. In such a head assembly, one of the side surface of a substrate is formed as a cleavage surface, along which a break surface is formed on a dielectric thin film of a light guiding layer formed on the substrate. The break surface thus obtained is used as a light receiving surface of the light guiding layer.

It is, therefore, one of the object of the present invention to provide an optical IC-type head assembly which includes a light receiving surface for receiving a laser beam from a laser oscillator efficiently and can be massproduced automatically with a simple and easily employable construction.

In a further aspect of the present invention, a substrate of an optical IC-type head assembly is made of crystal material having cleavability, and a dielectric thin film of a light guiding layer is formed monolithically on the substrate. Then, the substrate is cleaved along the cleavage plane of the substrate, thereby forming a break surface on the light guiding layer for receiving the laser beam. In a preferred embodiment, the substrate is made of single crystal.

It is, therefore, a further object of the present invention to provide a method for producing the above described head assembly.

According to such a method, it is possible to obtain a perfect and smooth surface for receiving a laser beam, to reduce the number of steps necessary for producing an optical IC-type head assembly, enabling automation and massproduction of such head assembly.

In another aspect of the present invention, an optical IC-type head assembly includes a beam splitter disposed between a laser oscillator and a converging-type grating coupler for dividing a beam reflected by an optical disc and coming out of the grating coupler into two symmetrical beams. Each of the split beams forms a predetermined acute angle with respect to the central optical axis of the reflected beam and is received by photo detecting elements which converts the received laser beam into electrical signals. Accordingly, it is possible to eliminate scattering and aberration of the laser beam emitted by the laser oscillator toward the converging-type grating coupler.

Preferably each of the split beams forms an angle less than 30 degrees with respect to the central optical axis of the backward beam from the grating coupler.

The beam splitter may also have a function of converging each split beam on a point positioned between the laser oscillator and the grating coupler. In this case, the photo detecting elements can be embedded in the substrate.

Accordingly, it is another object of the present invention to provide an optical IC-type head assembly for focussing an effective small spot on an optical disc without

BRIEF DESCRIPTION OF THE DRAWINGS

Further objects and advantages of the present invention will be apparent from the following description by way of example and with reference to the accompanying drawings, in which.

DESCRIPTION OF THE PREFERRED EMBODIMENTS

Preferred embodiments of the present invention will now be explained with reference to FIGS. 8 and 9.

Figure 1:
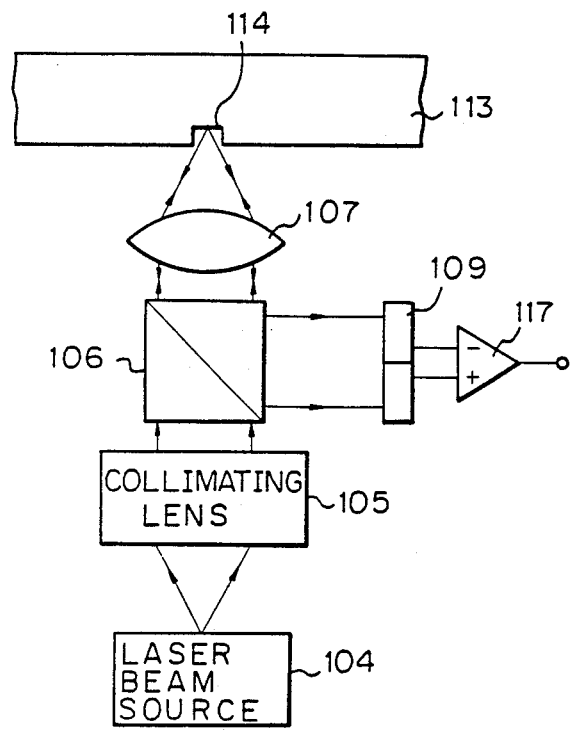
FIG. 1 is a diagrammatic illustration of a well-known optical head assembly.
Figure 2:
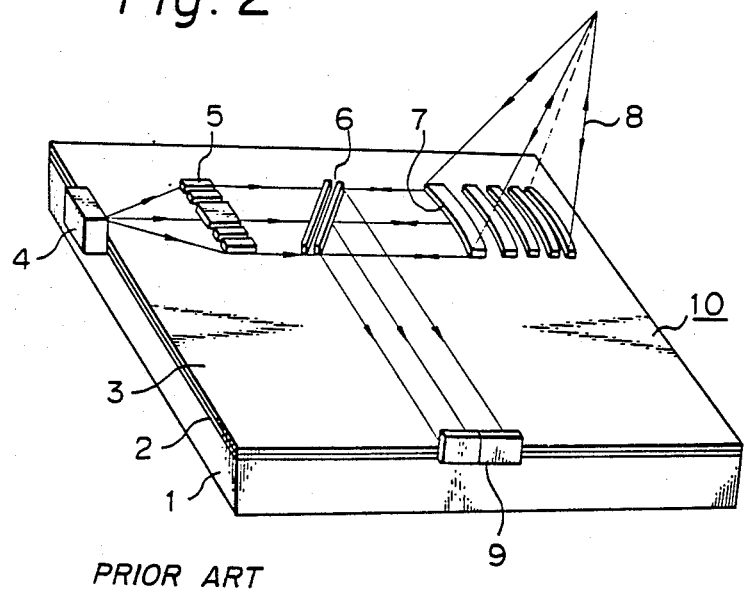
FIG. 2 is a perspective view of the first example of the optical IC-type head assemblies constituting the prior
Figure 3:
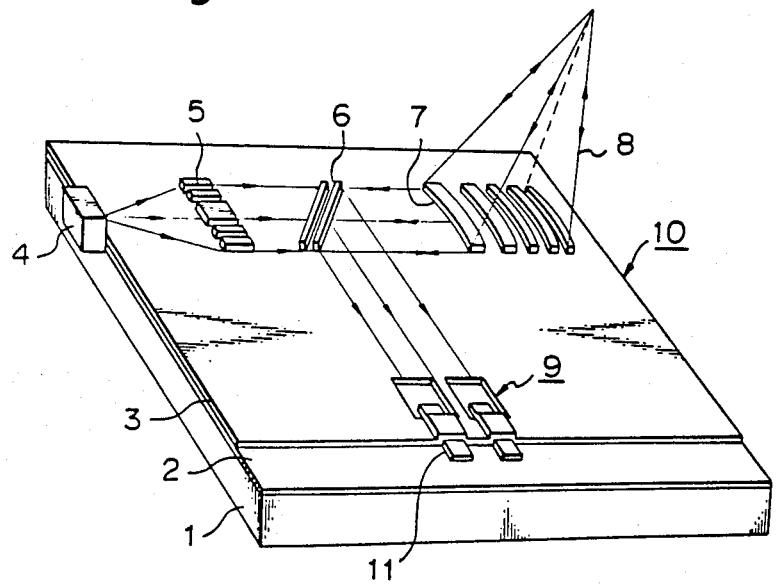
FIG. 3 illustrates a modification of the head assembly shown in FIG. 2.
Figure 4:
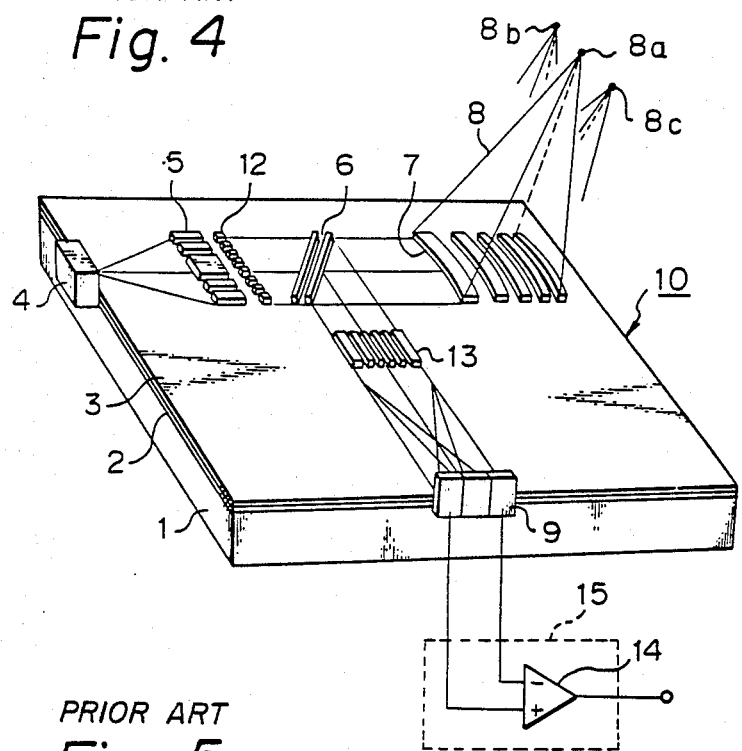
FIG. 4 is a perspective view of the second example of prior art.
Figure 5:
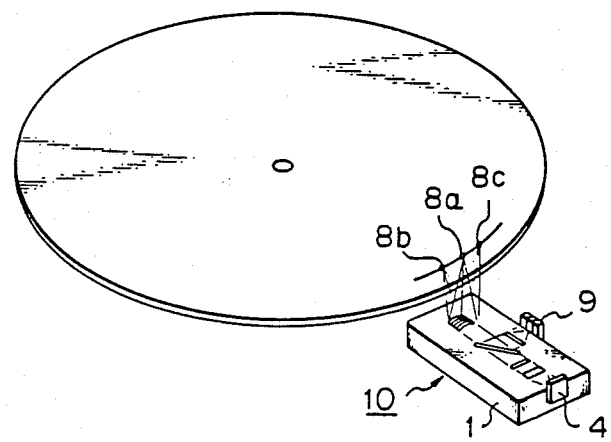
FIG. 5 shows a positional relation between an optical disc and the head assembly shown in FIG. 4.
Figure 6:
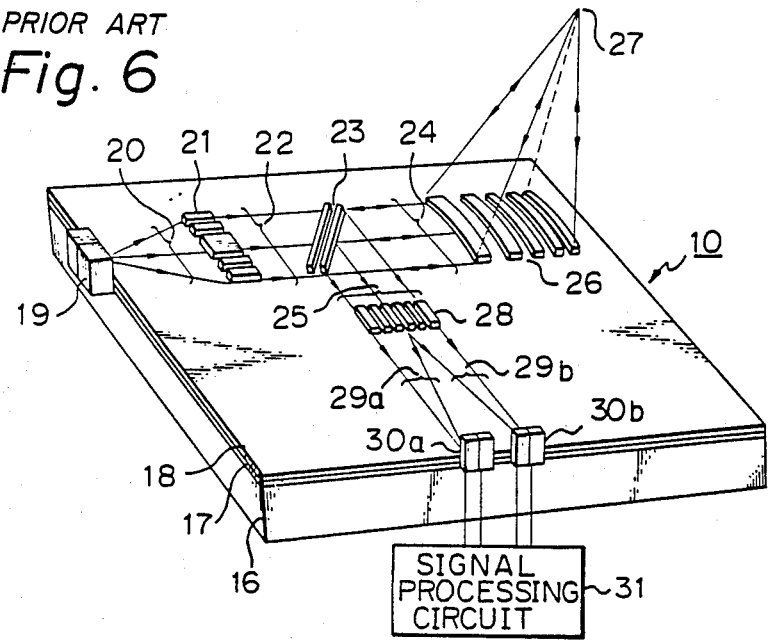
FIG. 6 is a perspective view of the third example of the prior art.
Figure 7:
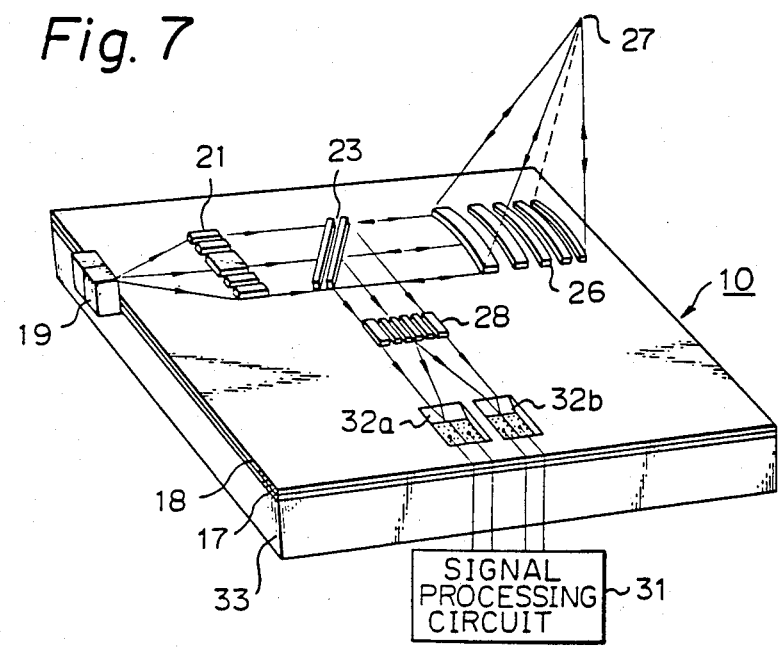
FIG. 7 shows a modification of the head assembly shown in FIG. 6.
Figure 8:
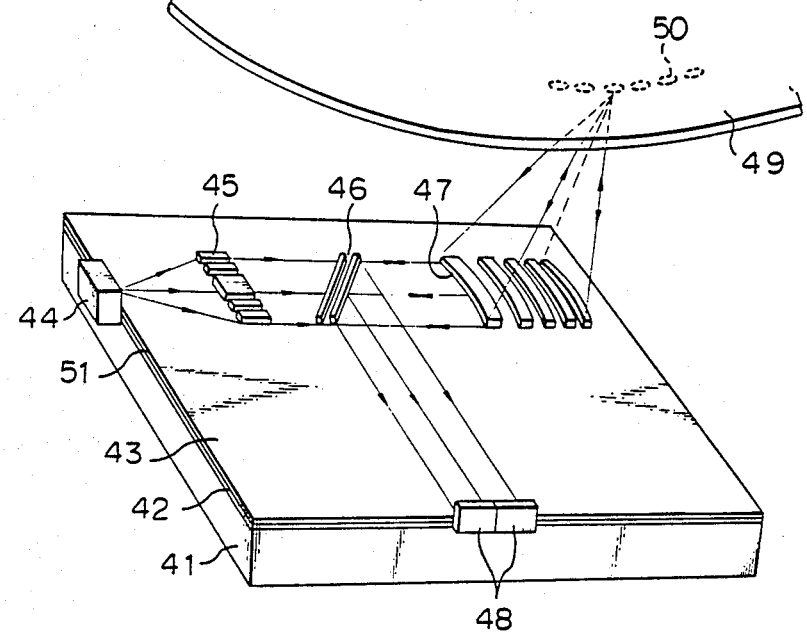
FIG. 8 is a perspective illustration of an embodiment of optical IC-type head assemblies according to the present invention.

Referring to FIG. 8 showing the first embodiment of the present invention, an optical IC-type head assembly comprises a substrate 41, a buffer layer 42 formed on the substrate 41 and a dielectric thin film-like light guiding layer 43 formed on the buffer layer 42 by vapor deposition, sputtering and the like. At one of the side surfaces of the light guiding layer 43, a laser diode 44 is disposed. On the light guiding layer 43 a collimating lens 45, a beam splitter 46 and a converging-type grating coupler 47 are provided by applying such method as photolithography, electron beam drawing or plasma etching to photopolymer covering a dielectric layer formed on the light guiding layer 43. The grating coupler 47 is formed by a group of unequally spaced curves and converges an incident laser beam at a point which is positioned at the center of an information pit 50 arranged on an optical disc 49. A photo detector 48 having two photo detecting elements is provided to receive a laser beam reflected by the information pit and coming out of the grating coupler 47 and to convert the received beam into electrical signals.

The substrate 41 is made of single crystal material. It is well-known as the cleavability of crystal that the single crystal material can be easily cleaved in a certain orientation to form a smooth cleavage surface. Accordingly, by selecting a crystal orientation of the substrate 41 and breaking it, a cleavage surface can be obtained on the substrate 41. On the other hand, the light guiding layer 43 is, in many cases, composed of amorphous material such as glass and has no cleavability.

In the present invention, the substrate 41 and the light guiding layer 43 are formed monolithically and the substrate 41, acting as a base plate much thicker than the light guiding layer 43, is made of single crystal material, so, along with the formation of the cleavage surface on the substrate 41, the dielectric thin film of the light guiding layer 43 can form a break surface 51 along the cleavage plane of the substrate 41. The break surface 51 is perfect and smooth and perpendicular to the optical axis of the light guiding layer 43, and acts as the light receiving surface, at which the laser diode 44 is disposed.

The break surface 51 of the light guiding layer 43 thus obtained is used as a surface for both mounting the laser diode 44 and receiving the beam therefrom. Accordingly, it is easy to obtain a surface that satisfies the condition for receiving the laser beam from the laser diode 44 as much as possible and to enhance the optical coupling between the light guiding layer 43 and the laser diode 44.

In the embodiment described above, the substrate 41 is made of single crystal material, but, it is noted that the substrate 41 can be composed of crystal material other than ingle crystal if the material can be broken so as to form a cleavage surface.

Further, in the above-described embodiment, the photo detector 48 is disposed at a side surface of the dielectric thin film of the light guiding layer 43, but, the photo detector may be monolithically formed in the light guiding layer 43.

As explained above, an optical head assembly according to the first embodiment of the present invention is constructed such that the substrate on which the dielectric thin film of the light guiding layer is formed is composed of crystal material having cleavability and that the light receiving surface of the light guiding layer is formed along the cleavage plane of the substrate.

Accordingly, it is possible to form the light receiving surface of the light guiding layer as a perfect and smooth surface by forming the dielectric thin film of the light guiding layer monolithically on the substrate and, after that, breaking the substrate to form the cleavage plane. As a result, the present invention takes effects of providing a perfect and smooth surface with optically high accuracy, decreasing the number of the steps necessary for producing such an optical head assembly and enabling automation and massproduction.

Figure 9:
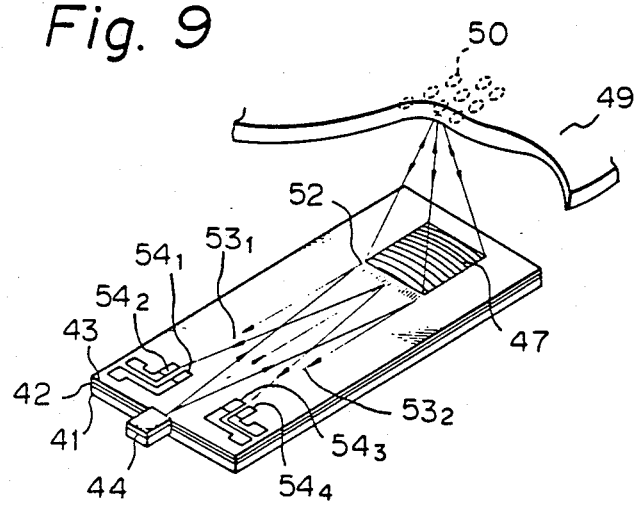
FIG. 9 is a perspective illustration of another embodiment of optical IC-type head assemblies according to the present invention.

Referring to FIG. 9, a diagrammatic view of the second embodiment of the present invention is shown. In the Figure, like parts are designated by the same reference numerals as in FIG. 8.

An optical head assembly of this embodiment comprises a substrate 41 and a dielectric thin film-like light guiding layer 43 on the substrate 41. A semiconductor laser 44 is mounted at one side surface of the light guiding layer 43 so as to inject the laser beam to the side surface of the layer 43.

On the light guiding layer 43, there are provided a converging-type grating coupler 47 which is formed by a group of unequally spaced curves and acts to converge the laser beam to a focussed spot on the information recording surface of the disc 49 external of the light guiding layer 43.

Between the laser 44 and the grating coupler 47, a beam splitter 52 is disposed for splitting the reflected beam from the disc 49 into two beams $53_1$ and $53_2$ symmetrically with respect to the direction of the reflected beam such that each optical axis of the split beams forms an angle less than 30 degrees with respect to the central optical axis of the reflected beam, and for converging the split beams $53_1$ and $53_2$ at a photo detector device.

The photo detector device comprises two pairs of photo detecting elements $54_1$, $54_2$, $54_3$ and $54_4$ all embedded in the substrate 41. Each pair of the photo detecting elements is disposed in the opposite side of the central optical axis and receives the respective split beam to convert it to electrical signals.

In operation, the laser beam injected from the semiconductor laser 44 to the light guiding layer 43 passes through the light guiding layer 43 and is converged on the focussed spot on the disc 49 by means of the converging-type grating coupler 47. In this case, the laser beam is sent through the beam splitter 52 to the grating coupler 47, but, it is possible to eliminate to the utmost the scattering and aberration occurring when the laser beam passes through the beam splitter 52, because the beam splitter 52 is formed by two symmetrically disposed sections each forming a small tilt angle (less than 30 degrees).

After a signal pit 50 on the disc 49 has been read out by the focussed spot of the laser beam, the reflected beam from the disc 49 is guided to the light guiding layer 43 by the grating coupler 47. The guided beam is divided by the beam splitter 52 symmetrically into two beams each forming an angle less than 30 degrees with respect to the central optical axis of the reflected beam. These split beams $53_1$ and $53_2$ are converted by the photo detecting elements $54_1$–$54_4$ to electrical signals efficiently.

As described above, the beam splitter 52 operates to split the beam coming out of the grating coupler 47 into two symmetrical beams such that the optical axis of each of the split beams forms an angle less than 30 degrees with respect to the optical axis of the reflected beam. Accordingly, by employing such a beam splitter an optical head assembly can be constructed such as to eliminate the disadvantages of the scattering and aberration of the incident light beam, resulting in forming the narrower beam spot on the disc. Further, by adding to the beam splitter such a weak converging function as that of the convex lens, the convergence point of the backward beam can be shifted from the vicinity of the mounting surface of the semiconductor laser 44 toward the grating coupler 47, enabling the embedded photo detector to be constructed easier.

As stated heretofore, an optical head assembly according to the second embodiment of the present invention comprises the beam splitter for splitting the beam reflected by the information recording surface and coming out of the grating coupler into two symmetrical beams each forming a predetermined acute angle with respect to the direction of the reflected beam and for focussing the split beams, which are received by the photo detector and then converted to electrical signals. In other words, the beam splitter divides the backward beam coming out of the grating coupler, i.e., the reflected beam from the information record surface, into two beams each forming such a predetermined acute angle as less than 30 degrees, and the beam splitter sends the split beams to the photo detector. It becomes, therefore, possible to eliminate the scattering and aberration of the laser beam propagating from the semiconductor laser to the grating coupler. Moreover, the effect of narrowing the laser beam is achieved to produce an effective small spot of light on the disc.

Although in the above embodiments the optical head assembly of the present invention was applied to a system for reading out the information on a disc, it may be applied to an information recording system in which a high-power semiconductor laser beam modulated with recording information signals is emitted to a thin film on a disc formed by vapor deposition of material such as $TeO_2$.

While the invention has been particularly shown and described with reference to preferred embodiments thereof, it will be understood by those skilled in the art that the foregoing and other changes in form and details can be made therein without departing from the spirit of the invention.

The scope of the invention, therefore, is to be determined solely by the following claims.

What is claimed is:

1. A method of producing an optical head assembly having an efficient light source coupling surface comprising the steps of:
    A. forming a substrate from material which can be readily cleaved along a plane in at least one direction;
    B. forming a light-guiding layer having an axis along which light propaqates on the substrate, the light-guiding layer being aligned on the substrate with the light propagation axis substantially perpendicular to the substrate cleavage plane; and
    C. cleaving the substrate along the cleavage plane, the light-guiding layer fracturing along the cleavage plane during the cleaving operation to form a smooth light source coupling surface substantially parallel to the cleavage plane.

2. A method of producing an optical head assembly according to claim 1 wherein step B comprises the step of forming the light-guiding layer from a dielectric thin film.

3. A method as set forth in claim 2 further including the steps of:
    forming a dielectric layer on the dielectric thin film of the light guiding layer; and
    forming a collimating lens, a beam splitter and a converging-type grating coupler on the dielectric layer.

4. A method as set forth in claim 3 wherein the substrate is made of single crystal material.

5. A method as set forth in claim 4 wherein the step of cleaving the substrate comprises:
    selecting the crystal orientation of the single crystal material of which the substrate is made; and
    cleaving the substrate along the cleavage plane of the substrate.

* * * * *